Figure 1:
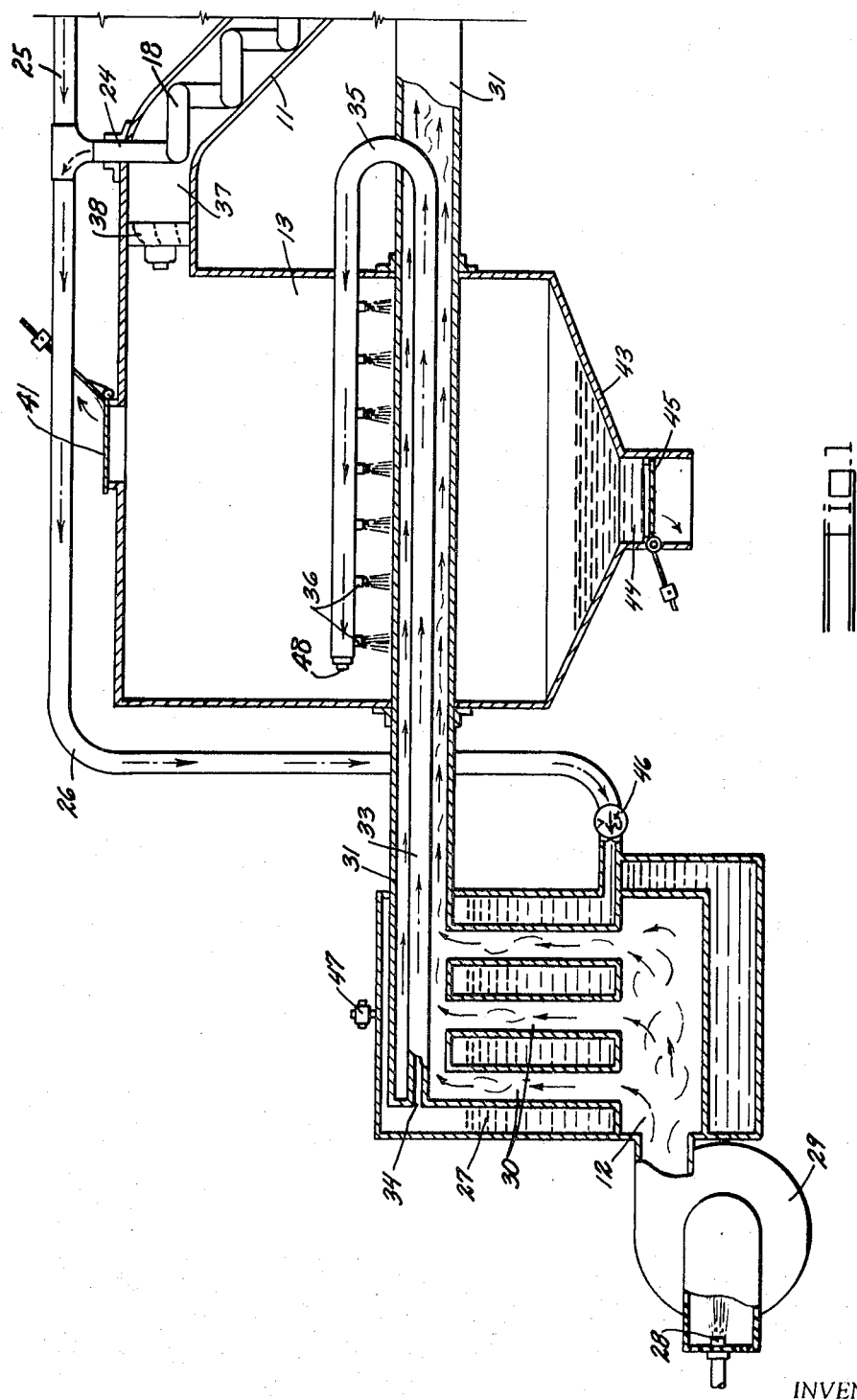

United States Patent

[11] 3,619,380

| [72] | Inventor | Bufford R. Stephens |
| | | 1305 Linden Ave., Boulder, Colo. 80302 |
| [21] | Appl. No. | 813,099 |
| [22] | Filed | Apr. 3, 1969 |
| [45] | Patented | Nov. 9, 1971 |

[54] APPARATUS FOR THE DISTILLATION OF SEA WATER
7 Claims, 2 Drawing Figs.

[52] U.S. Cl. .................................................. 202/180,
202/185 E, 202/205, 202/166, 202/236, 203/11,
203/100, 203/90
[51] Int. Cl. ........................................................ B01d 3/10
[50] Field of Search ............................................ 202/205,
236, 242; 203/10, 11, 100, 26, 90, DIG. 17

[56] References Cited
UNITED STATES PATENTS

| 415,227 | 11/1889 | Sweeney .................... | 202/165 |
| 645,790 | 3/1900 | Conover ..................... | 202/165 |
| 1,320,719 | 11/1919 | Stutzke ....................... | 159/48 |
| 1,544,348 | 6/1925 | Rorke .......................... | 203/DIG. 17 |
| 2,475,481 | 7/1949 | Clemens ..................... | 202/180 |
| 3,245,883 | 4/1966 | Loebel ........................ | 203/11 |
| 3,356,591 | 12/1967 | Peterson ..................... | 203/90 |
| 3,395,084 | 7/1968 | Loebel et al. ............... | 202/180 |
| 3,461,041 | 8/1969 | Snyder ........................ | 203/11 |
| 3,488,261 | 1/1970 | Loebel ........................ | 202/236 |

Primary Examiner—Wilbur L. Bascomb, Jr.
Attorney—R. H. Galbreath

ABSTRACT: Impure water such as sea water is pumped through both a first preheater heated by superheated steam and a condenser heated by combustion gases from a furnace to produce wet steam which is then additionally superheated by passage through the interior of a flame tube, carrying the combustion gases from said furnace, and is then sprayed against the exterior of said flame tube within an enclosed separator to flash the contained water so as to separate and release the salts and other impurities from the steam.

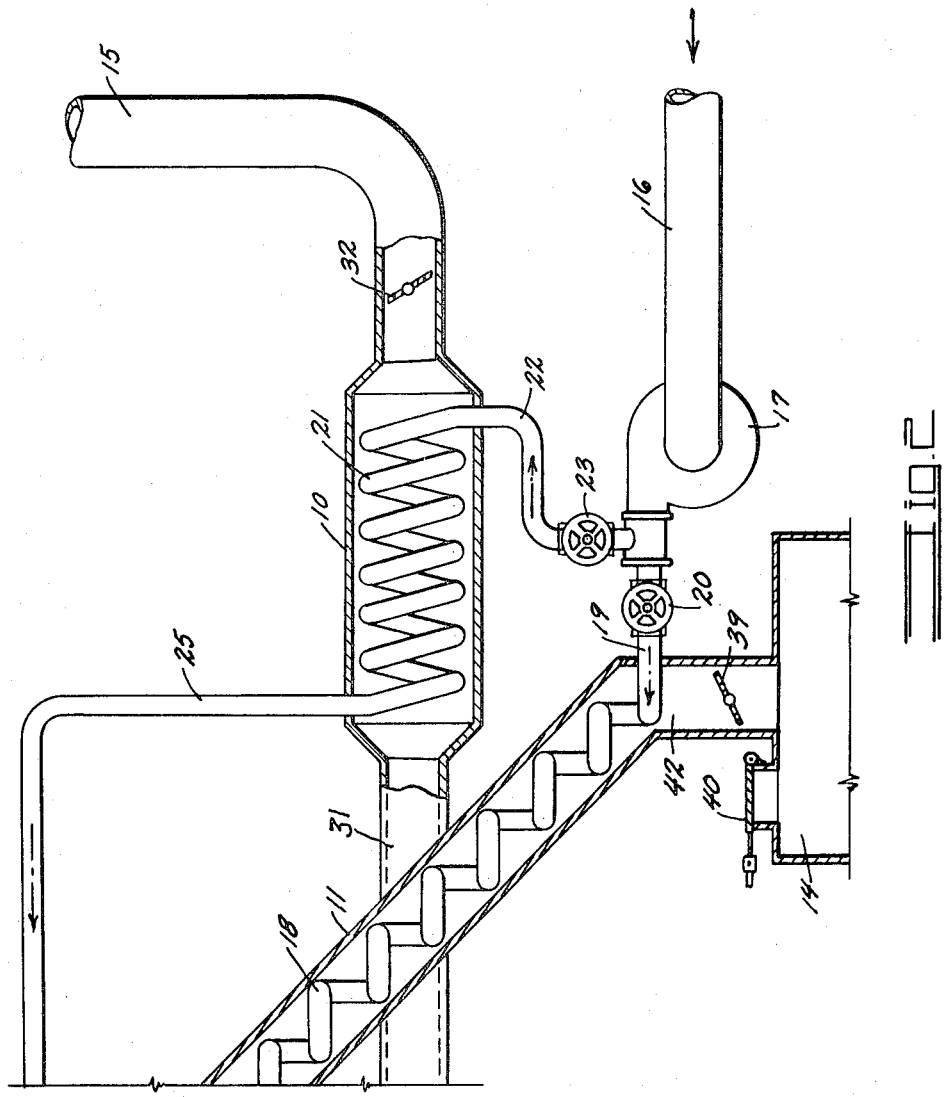

APPARATUS FOR THE DISTILLATION OF SEA WATER

The present invention relates to apparatus for rendering saline waters, such as sea water, usable for domestic purposes.

The principal object of the invention is to provide means for accomplishing the above which can be economically, continuously, and effectively operated at exceedingly high capacity so that it will be practical for installation and use in regions where natural fresh water is scarce or unavailable and abundant sea water is economically available.

Other objects and advantages reside in the detail construction of the invention, which is designed for simplicity, economy, and efficiency. These will become more apparent from the following description.

In the following detailed description of the invention, reference is made to the accompanying drawings which form a part hereof. Like numerals refer to like parts in all views of the drawings and throughout the description.

In the drawings:

FIGS. 1 and 2 combine to form a continuous diagrammatic vertical longitudinal section through the apparatus of this invention with parts appearing in section and elevation.

The apparatus illustrated includes, among others, the following elements: a preheater 10; a condenser 11; a furnace 12; a separator chamber 13; a purified-water tank 14; a combustion stack 15 and a raw-water inlet main 16.

The raw water is drawn from the main 16 by a suitable feed pump 17 and is discharged into a condensing coil 18 in the condenser 11, through a supply pipe 19 controlled by a volume control valve 20, and into a preheater coil 21 in the preheater 10, through a feed pipe 22 controlled by a second raw water valve 23. Hot water is conducted from the coils 18 and 21 through hot water conduits 24 and 25, respectively, which both discharge into a wet steam pipe 26 which feeds hot water and wet steam to a steam dome 27 which completely surrounds the furnace 12.

The furnace may have any desirable heat source. As illustrated, it is provided with a burner 28 which may be supplied with suitable fuel such as oil or gas to produce a flame which is blown into the fire box of the furnace 12 by means of a flame fan 29. The burner 28 is supplied with combustion air as is customary wit oil or gas burners. A plurality of flame tubes 30 arise from the fire box of the furnace 12 and extend through the steam dome 27 to conduct the hot combustion gas from the dome 27 into a heat tube 31 which extends horizontally through the separator chamber 13 and through the preheater 10, about the preheater coil 18, to the stack 15 under the control of a stack damper 32.

A superheated-steam pipe 33 is connected with the steam dome 27, as shown at 34, and is positioned axially within the heat tube 31. The superheated-steam pipe 33 extends sufficiently far within, and longitudinally of, the heat tube 31 to absorb the major portion of the temperature from the combustion gases passing through the tube 31 so as to additionally superheat the superheated steam discharging from the steam dome 27. The pipe 33 is then doubled back upon itself, as indicated at 35, so as to return above and parallel with the heat tube within the confines of the separator chamber 13 to a plugged extremity 48. The returning portion of the superheated steam pipe within the separator chamber 13 is provided with a plurality of spaced-apart spray nozzles 36 which discharge and direct steam sprays downwardly against the exterior of the heat tube 31 within the confines of separator chamber 13.

The separator chamber 13 comprises a sealed tank or drum of any desired shape and size depending upon the desired assembled arrangement and is provided adjacent its top with a steam passage 37 which connects with the upper extremity of the downwardly extending condenser 11. The steam passage is provided with a suitable power-driven exhaust fan 38 which will draw steam, vapors and gases from the separator chamber so as to maintain a condition of no-pressure or partial vacuum therein. The hot exhausting steam, vapors and gases are forced by the fan 38 into heat-exchange relation with the condensing coil 18 of the condenser 11 and are then discharged, together with the pure water condensate, into the purified water tank 14 through an exhaust passage 42. The vapor temperature and the pressure in the condenser can be manually controlled by an adjustable damper 39 in the exhaust passage 42 to obtain maximum condensation results. Excess pressure is exhausted from the purified-water tank 14 through an adjustable exhaust damper 40 which prevents the entry of contaminants to the purified water.

The buildup of pressure in the separator chamber is prevented by a relatively large preset valve lid 41 installed in the top of the chamber. The lid 41 will be held closed should there be a partial vacuum in the chamber and is set to open at exceedingly low pressure, for instance, 5 pounds per square inch.

The separator chamber is provided with a closed hopperlike bottom 43 which forms a sump for the chamber and which directs deposits to a discharge outlet 44. The discharge outlet is provided with a prebalanced dump gate 45 which will be normally closed but which will swing open when a predetermined weight of deposits rest thereon to discharge the accumulated deposits and then swing closed to maintain the partial vacuum in the chamber. Any water that should accumulate with the deposits will assist in maintaining the closed dump gate air tight.

TYPICAL OPERATION

Let us assume that the furnace 12 is operating at a flame temperature of 2,200° F. and that the feed pump 17 is operating to furnish 40° F. raw water to supply pipe 19 and the feed pipe 22 at a relatively low pressure sufficient to maintain flow through the steam dome 27 and the superheated-steam pipe 33 and the nozzles 36. A portion of the incoming cold water will be heated in the preheater 10 to a temperature of say 250°–300° F. and the remainder of the flowing water will be heated to a temperature of say 400°–500° F. in the coil 23 of the condenser 11. Both portions of preheated water will flow through the wet steam pipe 26 to the steam dome 27 at a temperature of from 400° F. to 500° F.

The steam is superheated by the flame tubes 30 in the steam dome and is fed into the superheated steam pipe 33 at a temperature of 500°–650° F. where it is additionally preheated by the combustion gases in the heat tube 31 and sprays from the nozzles 36 at a temperature of from 650° F. to 850° F.

The surface temperature of the heat tube within the separator 13 is normally from 1000° F. to 1,200° F. and could reach from 2,000° F. to 2,700° F. depending upon the size and efficiency of the furnace 12. The exceedingly superheated steam discharging from the nozzles contains all of the salts such as calcium, magnesium, etc. and other undesirable impurities intermixed with liquid water in globular or molecular forms. When the dispersed microscopic globules of water in the superheated sprays from the nozzles 36 strike the surface of the heat tube they instantaneously flash or explode into smaller globules of an almost gaseous form of steam which being lighter than air will be drawn upwardly in the partial vacuum of the separator chamber by the fan 30 and discharged into the condenser 11. The nonwater impurities will congregate on the heat tube and eventually descend to the bottom 43 so as to be intermittently discharged through the discharge outlet 44.

Since there is a partial vacuum in the separating chamber, there is no atmospheric resistance to the "flash" and the latter will be greatly accelerated, and, since pressure does exist in the condenser, due to the fan 38, the heat exchange from the discharging purified water particles or globules to the relatively cool condenser coil 18 is greatly facilitated due to the intimate thermal contact produced by the sudden pressure increase. The result is maximum capacity with a minimum heat loss.

Attention is called to the fact that there are minimum hydraulic or pneumatic pressures involved in the entire apparatus as all flow lines for both the water, the steam and the combustion gases are constantly open for the discharge of pressures unless they become accidentally plugged. A check valve 46 may be installed in the wet steam pipe 26 to prevent the return of water from the steam dome 27 should the nozzles 36 become plugged and a relief valve 47 may be installed on the steam dome 27 which would open at say 5 p.s.i. to prevent accidental buildup in the steam dome.

While only one furnace and one heat tube have been illustrated, multiple similar furnaces and multiple similar heat tubes could be used in one or more separator chambers depending upon field conditions and capacities desired.

Additional condensers of any desired type similar in principle to condenser 11 may be connected to a single separator chamber to increase the capacity of the apparatus and suitable temperature gauges may be provided for control purposes.

The valves 20 and 23 and the dampers 32 and 39 are manipulated by the operator to maintain the most efficient temperature graduations in the apparatus. The heat tube 31 is formed of a special alloy capable of withstanding temperatures up to 5,000° F.

While a specific form of the invention has been described and illustrated herein, it is to be understood that the same may be varied within the scope of the appended claims, without departing from the spirit of the invention.

I claim:

1. Means for the purification of water comprising:
   a. a closed separating chamber having a vapor outlet adjacent its top and an impurity collecting sump at its bottom;
   b. a heat tube extending through said chamber above said sump;
   c. a plurality of nozzles supported in said chamber so as to direct sprays against the exterior of said heat tube;
   d. means for passing heated gases through said heat tube to heat the latter sufficiently to instantly vaporize the water in said sprays upon contact therewith;
   e. a superheated-steam pipe positioned within said heat tube and extending externally of the latter into communication with said nozzles at its one extremity;
   f. means for supplying superheated steam into the other extremity of said superheated-steam pipe;
   g. a fired furnace;
   h. means for discharging the combustion gases from said furnace into said heat tube about said superheated-steam pipe;
   i. a steam dome positioned on and heated by said furnace and discharging into said other extremity of said superheated-steam pipe;
   j. means for supplying heated water to said steam dome;
   k. a condenser;
   l. a condensing coil enclosed within said condenser;
   m. a wet steam pipe connecting the discharge extremity of said coil with said steam dome; and
   n. a vapor passage connecting the intake extremity of said condenser with a vapor outlet of said separating chamber so that vapor from said chamber will pass in heat exchange relation with said coil to preheat the water therein.

2. Means for purification of water as described in claim 1 having:
   a. an exhaust fan positioned in said vapor passage and acting to exhaust vapor from said separating chamber to reduce the pressure in said chamber and to increase the pressure in said condenser.

3. Means for the purification of water as described in claim 2 having:
   a. pressure relief means in said separating chamber which will open should the pressure therein rise about atmospheric pressure.

4. Means for the purification of water as described in claim 2 having:
   purified-water a purified water tank; and
   b. an exhaust passage communicating between said condenser and said water tank to conduct the condensate from the former to the latter.

5. Means for the purification of water as described in claim 4 having:
   a. means for preventing the buildup of pressure over the water in said purified water tank.

6. Means for the purification of water as described in claim 1 having:
   a. means for resisting the buildup of pressure in said chamber.

7. Means for the purification of water as described in claim 6 in which the means for resisting the buildup of pressure in said chamber comprises:
   a. an exhaust fan positioned between said vapor passage and said condenser acting to exhaust vapor from the former into the latter.

* * * * *